April 21, 1964   J. C. MEYER   3,129,981
QUICK DISCONNECT SLIDE FOR DRAWERS AND THE LIKE
Filed Aug. 11, 1960
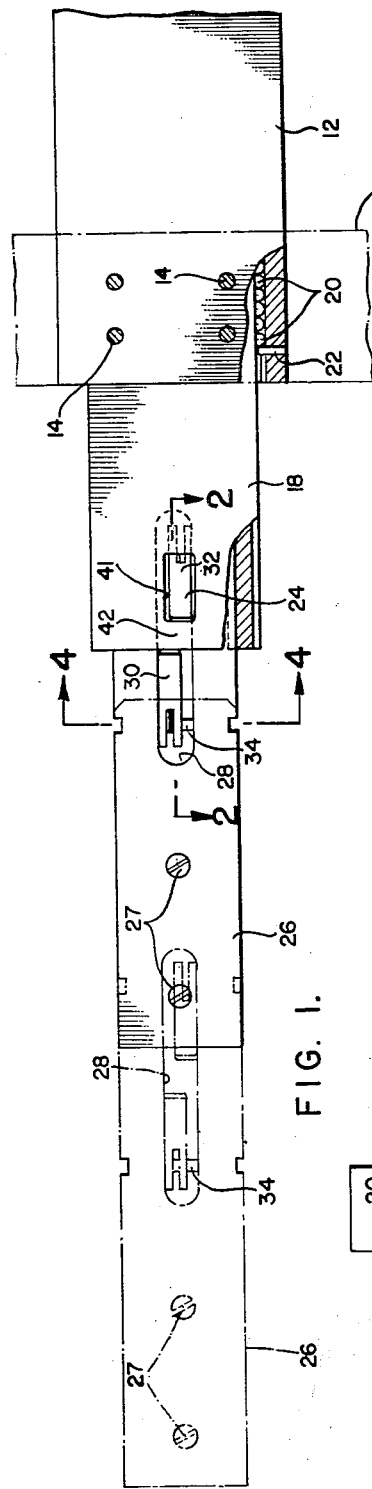
INVENTOR.
JOHN C. MEYER
BY
ATTORNEYS

United States Patent Office 3,129,981
Patented Apr. 21, 1964

3,129,981
QUICK DISCONNECT SLIDE FOR
DRAWERS AND THE LIKE
John C. Meyer, Fullerton, Calif., assignor to Jonathan
Manufacturing Company, Fullerton, Calif., a corporation of California
Filed Aug. 11, 1960, Ser. No. 48,995
4 Claims. (Cl. 308—3.6)

This invention relates to an improved quick disconnect slide structure for drawers and the like.

In the mounting of electronic equipment such as telemetering devices in a cabinet it is the practice to support same on a sliding member which is in turn mounted upon a stationary member fixed to the cabinet through one or more intermediate sliding elements. This means of mounting permits the equipment to be readily pulled out of the cabinet in much the same manner as a drawer for inspection and repair. It is frequently desirable to completely replace the whole device in a minimum of time when its condition requires such action and to delay repairing same until a more convenient time.

It is an object of this invention to provide means for securing the sliding member to the intermediate member in such a manner as to permit rapid and easy removal and replacement of same.

Still a further object of this invention is to provide a device which latches the sliding member in its outermost position preventing accidental removal thereof.

Other objects and advantages will be readily apparent from the following description.

In the drawings:

FIGURE 1 is a side elevation of a device embodying this invention.

FIGURE 2 is a view taken along line 2—2 of FIGURE 1.

FIGURE 3 is a view similar to FIGURE 2 showing the latch in the nested position.

FIGURE 4 is a view taken along line 4—4 of FIGURE 1.

Only a portion of the cabinet 10 is illustrated to which the stationary member 12 is fixed by screws 14. Nested within a channel 16 formed in the stationary member 12 is intermediate member 18. The inner faces of member 12 at the top and bottom of channel 16 and the outer faces of the top and bottom of member 18 are grooved to receive ball bearings 20 to permit the intermediate member to freely move in channel 16. A pin 22 in member 12 limits movement of ball bearings 20.

Intermediate member 18 has a channel 24 formed therein which slidably receives sliding member 26. This sliding member is secured by screws 27 to the base of the electronic equipment mounted within cabinet 10 and forms a support therefor.

The member 26 has a recess or groove 28 formed therein which receives a pair of opposed latch elements 30 and 32 therein. Each latch element is pivotally mounted upon a pin 34 and 36 which projects through a suitable bore 38 in member 26 and through one of the latch members. A spring such as 40 and 42 bears against member 26 and one of the latch elements 30 and 32 urging same to pivot away from member 26.

Adjacent the extremity of intermediate member 18 outermost from cabinet 10 a window 40 is cut. When sliding member 26 has been pulled outwardly to a position wherein latch element 30 clears the extremity of intermediate member 18 it pivots away from member 26.

At this point latch element 32 is opposite window 40 and also pivots outwardly. Thus the two latch elements straddle the portion 42 of intermediate member 18 and lock the sliding member against movement in either direction. If the latch element 32 is manually depressed against spring 42 the sliding member 26 can be further moved to the phantom line position of FIGURE 1 until it clears member 18 and thus the electronic component is removed from the cabinet for repair or replacement.

Similarly if latch element 30 is manually depressed slide member 26 is free to move back into the cabinet to return the electronic component to its functioning position.

In the drawings and the above description only one set of support elements has been described. It is desirable to provide a similar set for the other side of the electronic component being supported in the cabinet.

While what hereinbefore has been described is the preferred embodiment of this invention it is readily apparent that alterations and modifications can be resorted to without departing from the scope of this invention and such alterations and modifications are intended to be included within the scope of the appended claims.

I claim:

1. A support structure for drawers and the like comprising: a channeled member, said member having a window adjacent one end thereof, a second member sliding within said channeled member, a pair of spring urged opposed latch elements mounted upon said second member and spaced from one another so that the portion of said channeled member between the window and end thereof may fit between the adjacent ends of said latch elements.

2. A support structure for drawers and the like comprising: an elongated member having a window therein adjacent one end thereof, a second elongated member mounted for sliding movement with respect to said first mentioned member, a pair of spring urged latch elements mounted upon said second mentioned member and spaced from one another so that the portion of said first mentioned member between said window and the end of said first mentioned member may fit between the adjacent ends of said latch elements.

3. A support structure for drawers and the like comprising: a channeled member having a window adjacent one end thereof, a slide member sliding within said channeled member, means forming a recess within said slide member, a pair of biased latch elements nested within said recess having adjacent end portions thereof engaging opposite sides of the portion of said channeled member between the window and end thereof.

4. A support structure for drawer and the like comprising: a channeled member having a window adjacent one end thereof, a slide member sliding within said channeled member, means forming a recess within said slide member, a pair of latch elements pivotally mounted within said recess, means in said recess urging said elements to pivot in opposite directions, the adjacent extremities of said latch element being spaced from one another approximately the distance between said window and the end of said channeled member.

References Cited in the file of this patent
UNITED STATES PATENTS

| | | |
|---|---|---|
| 1,910,208 | Gronberg et al. | May 23, 1933 |
| 2,319,555 | Premo | May 18, 1943 |